United States Patent [19]
Jaegtnes

[11] 3,794,292
[45] Feb. 26, 1974

[54] SPOOL VALVE
[75] Inventor: Karl O. Jaegtnes, Aston, Pa.
[73] Assignee: Westinghouse Electric Corporation, Pittsburgh, Pa.
[22] Filed: May 15, 1972
[21] Appl. No.: 253,392

[52] U.S. Cl............... 251/31, 137/596.15, 251/25, 251/41
[51] Int. Cl........................................... F16k 31/383
[58] Field of Search..... 137/625.61; 251/25, 31, 36, 251/41

[56] References Cited
UNITED STATES PATENTS
2,650,609  9/1953  Herbst ............................ 251/31 X
2,934,765  4/1960  Carson ........................... 137/625.61

Primary Examiner—Robert G. Nilson
Attorney, Agent, or Firm—F. J. Baehr, Jr.

[57] ABSTRACT

A spool valve for automatically limiting the rate of flow of actuating fluid to an ON-OFF fast operating valve when the ON-OFF valve is closed and automatically increasing the rate of flow of actuating fluid as the ON-OFF valve begins to open.

4 Claims, 1 Drawing Figure

PATENTED FEB 26 1974 3,794,292
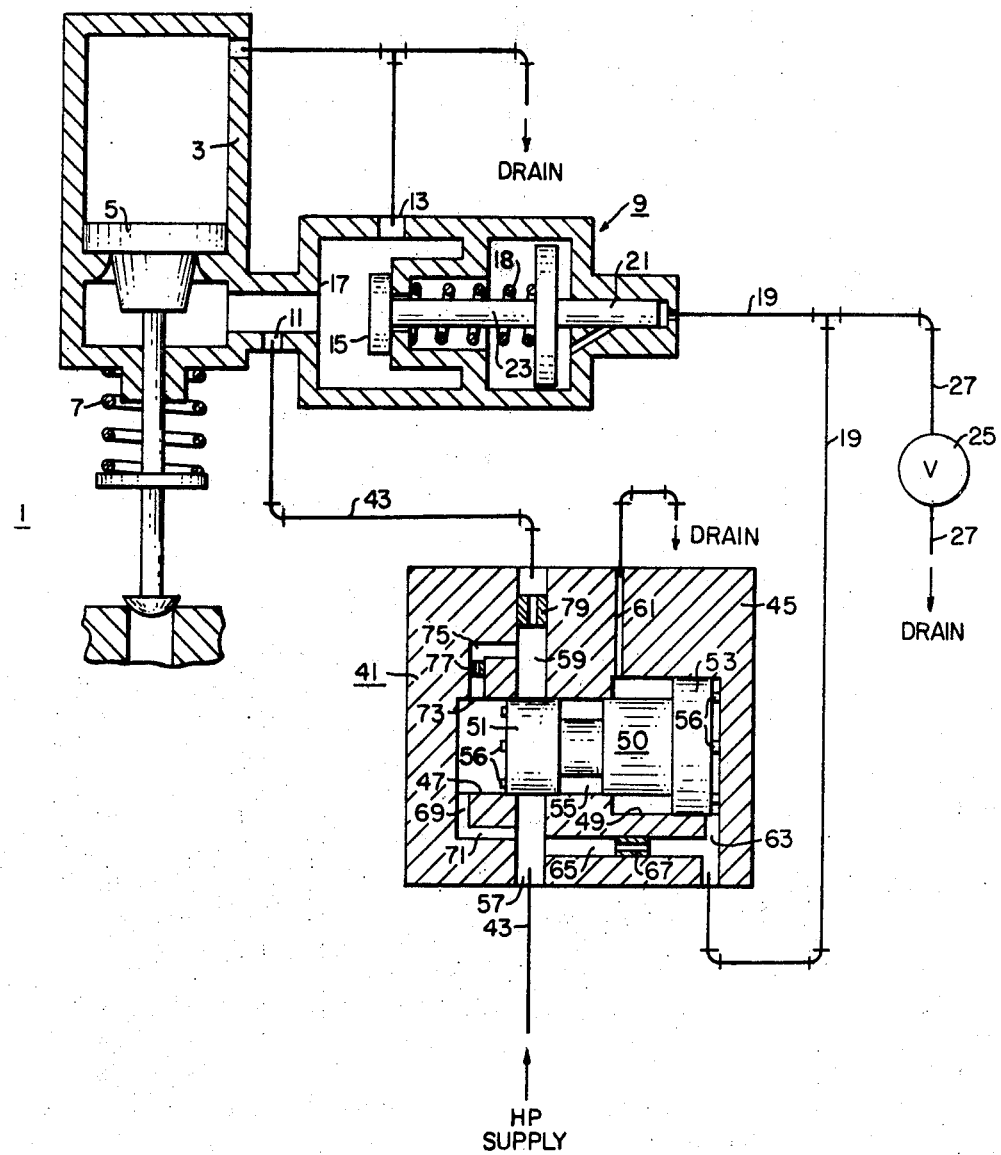

SPOOL VALVE

BACKGROUND OF THE INVENTION

This invention relates to quick operating valves for a steam turbine and more particularly a spool valve for controlling the flow of operating fluid to the quick operating valve.

To keep pace with the high rate of growth of power consumption, power companies have been installing larger and larger turbo-generator units operating at high pressures and temperatures, or nuclear units, which make reheating the steam after it has partially expanded in a high pressure portion of the turbine economical. Utilizing reheat cycles necessitates installing stop and interceptor valves in the piping between the reheater and the turbine as the reheater contains a large quantity of steam, which if allowed to expand through the turbine after the turbine loses its load could cause overspeeding and result in internal damage to the turbine. The interceptor valve is controlled by a controller responsive to the electrical load on the generator so that the interceptor valve anticipates losses of electrical load to begin shutting down the turbine at the first indication of loss of electrical load. Many of the disturbances, which cause a circuit breaker to open and which produce an indication of loss of load on the generator, will be transient and clear themselves. Thus, it is common practice to provide circuit breakers which automatically reclose one or more times before finally locking themselves out. Quick operating valves function to cut off the steam to the low pressure portion of the turbine as fast as possible by initiating closing of the intercept valve on stop valve upon loss of load.

Turbine steam valves are very large and being fluid actuated require large quantities of fluid energy to separate them rapidly. To increase the closing speed and to conserve the energy in the actuating fluid it is desirable to shut off the flow of operating fluid to the actuator when the valves are being closed. However, to keep the actuator at an even temperature and to insure that the system is primed, it is desirable to allow a continuous limited flow of actuating fluid.

SUMMARY OF THE INVENTION

In general, a spool valve, when made in accordance with this invention, comprises a housing having a bore and a counterbore, a spool member having a first cylindrical portion slidably disposed within the bore and a second cylindrical portion slidably disposed within the counterbore. The first cylindrical portion has a circumferential groove disposed therein and the spool valve further comprises a first and second port cooperatively associated with the groove so that when the spool member is in one position the first and second ports are blocked by the first cylindrical portion and when in another position the first and second ports are in fluid communication with the groove and with each other, a third port in fluid communication with the end of the counterbore adjacent the bore, a fourth port in fluid communication with the end of the counterbore opposite the end adjacent the bore and means for placing the first port in fluid communication with the end of the bore opposite the end adjacent the counterbore.

BRIEF DESCRIPTION OF THE DRAWINGS

The objects and advantages of this invention will become more apparent from reading the following detailed description in connection with the accompanying drawing, in which the sole FIGURE is a schematic diagram of a fluid control system for operating an ON-OFF valve in a steam line incorporating a spool valve made in accordance with this invention.

DESCRIPTION OF THE PREFERRED EMBODIMENT

Referring now to the sole FIGURE in detail, it shows an ON-OFF steam valve 1 having a fluid actuator 3 comprising a piston or movable abutment 5 which is moved in one direction to close the valve by the bias of the spring 7 and moved in the other direction to open the valve by pressurized actuating fluid reacting against one side of the piston 5, the lower side as shown in the drawings. A dump valve 9 has an inlet port 11 in fluid communication with the pressurized actuating fluid being supplied to the actuator 3 and an outlet or drain port 13 in fluid communication with the drain and in fluid communication with the actuator 3. A valve plug 15 and seat 17 is disposed in blocking relation between the inlet port 11 and outlet port 13. The plug 15 is held in the blocking position against the bias of a spring 18 by actuating fluid supplied by a conduit 19 reacting against a piston 21 connected to the valve plug 15 by a valve stem 23. A solenoid valve 25 or other means for shutting off the flow of fluid is disposed in a drain conduit 27 which is also in communication with the conduit 19. The valve 25 is operable by a signal from a controller (not shown), which responds to a signal to close the steam valve 1 initiated by a sudden loss of load or other operating condition.

A spool valve 41 is disposed in a conduit 43 supplying pressurized actuating fluid to the inlet port 11 of the actuator 3. The spool valve 41 comprises a housing 45 having a bore 47 and a counterbore 49 and a spool member 50 having a first cylindrical portion 51 slidably disposed within the bore 47 and a second cylindrical portion 53 slidably disposed in the counterbore 49. The first cylindrical portion 51 has an annular groove 55 disposed therein. The ends of the spool member 50 have protrusions 56 extending therefrom to provide a space between the ends of the spool member and the ends of the bore 47 and counterbore 49.

A first or inlet port 57 and a second or outlet port 59 are cooperatively associated with the groove 55 so that when the spool member 50 is in one position, all the way to the right, as shown in the drawing, the inlet and outlet ports 57 and 59, respectively, are blocked by the first cylindrical portion 51 and when the spool member 50 is in another position, all the way to the left, the inlet and outlet ports 57 and 59 are in fluid communication with the groove 55 and with each other.

A third or drain port 61 is disposed in the housing 45 so as to be in fluid communication with the end of the counterbore 49 adjacent the bore 47.

A fourth port 63 is so disposed in the housing 45 to be in fluid communication with the end of the counterbore 49 opposite the end adjacent the bore 47 and with a drain through the conduits 19 and 27 and valve 25.

A duct 65 is so disposed in the housing 45 to place the inlet or first port 57 in fluid communication with the fourth port 63. The duct 65 has flow restricting means 67 disposed therein.

A fifth port 69 is in fluid communication with the end of the bore 47 opposite the end adjacent the counterbore 49 and a duct 71 places the port 69 in fluid communication with the inlet or first port 57.

A sixth port 73 is in fluid communication with the end of the bore 47 opposite the end adjacent the counterbore 49 and in fluid communication with the second or outlet port 59 via a duct 75 and has a flow restriction 77 disposed therein. The outlet port 59 also has a flow restriction 79 disposed therein.

The operation of the spool valve 41 and steam valve 1 is as follows: Assuming the solenoid valve 25 is closed; pressurized actuating fluid is supplied via the supply conduit 43 to the inlet port 57. The pressurized fluid flows into opposite ends of the bore and counterbore via ducts 71 and 65, respectively. Since the area of the counterbore 49 is larger than the area of the bore 47 and the end of the counterbore 49 adjacent the bore 47 is in communication with a drain via port 61, the spool member 50 moves from the one position shown in the drawing to another position, wherein the groove 55 registers with the inlet and outlet ports 57 and 59 respectively, allowing pressurized fluid to flow at a high rate via conduit 43 to the inlet port 11 of the valve actuator 3.

Actuating fluid simultaneously flows via conduit 19 to operate the piston 21 and seat the plug 15 shutting off the drain port 13 and allowing pressurized fluid entering the actuator 3 via port 11 to move the piston 5 upwardly opening the steam valve 1.

Upon receiving a signal from the controller to close the steam valve 1, the solenoid valve 25 opens and with the assistance of the restriction 67 drains fluid rapidly from one side of the piston 21 allowing the spring 18, associated therewith, to unseat the plug 15 and drain actuating fluid from the actuator 3 causing the spring 7 to close the steam valve 1 rapidly.

Simultaneously with the draining of actuating fluid from one side of the piston 21 actuating fluid is drained from the end of the counterbore 49 opposite the end adjacent the bore 47 causing an unbalance of the spool member 50 as pressurized fluid is still being supplied to the end of the bore opposite the end adjacent the counterbore which causes the spool member 50 to move to the one position, to the right as shown in the drawing, wherein the inlet and outlet ports 57 and 59, respectively, are blocked by the first cylindrical portion 51 of the spool member 50 reducing the flow of actuating fluid to a limited rate which assists in closing the steam valve rapidly.

The spool valve hereinbefore described advantageously reduces the fluid demand from the supply system when the ON-OFF valve is closed, but still passes sufficient fluid to keep the system primed and cooled.

What is claimed is:

1. A spool valve comprising a housing having a bore and a counterbore, a spool member having a first cylindrical portion slidably disposed within the bore and a second cylindrical portion within the counterbore, said first cylindrical portion having a circumferential groove disposed therein, a first port and a second port cooperatively associated with the groove so that when the spool member is in one position, the first and second ports are blocked by the first cylindrical portion and when in another position, the first and second ports are in fluid communication with the groove and with each other, a third port in fluid communication with the end of the counterbore adjacent the bore, a fourth port in fluid communication with the end of the counterbore opposite the end adjacent the bore, means for placing said first port in fluid communication with the end of the bore opposite the end adjacent the counterbore, means for placing the end of the bore opposite the end adjacent the counterbore in fluid communication with the second port, and flow restricting means disposed to restrict the flow between the first and second portion when the spool member is positioned to block the flow between said first and second port.

2. A spool valve as set forth in claim 1 and further comprising means for placing the first port in fluid communication with the fourth port and flow restricting means disposed in the means for placing the first port in fluid communication with the fourth port.

3. A spool valve as set forth in claim 1, wherein the third port is a drain port.

4. A spool valve as set forth in claim 1, wherein the second port is an outlet port and is in communication with an outlet duct having flow restricting means disposed therein.

* * * * *